United States Patent
Karabinis

(10) Patent No.: US 8,576,940 B2
(45) Date of Patent: Nov. 5, 2013

(54) SYSTEMS/METHODS OF ADAPTIVELY VARYING A BANDWIDTH AND/OR FREQUENCY CONTENT OF COMMUNICATIONS

(71) Applicant: EICES Research, Inc., Cary, NC (US)

(72) Inventor: Peter D. Karabinis, Cary, NC (US)

(73) Assignee: EICES Research, Inc., Cary, NC (US)

( * ) Notice: Subject to any disclaimer, the term of this patent is extended or adjusted under 35 U.S.C. 154(b) by 0 days.

(21) Appl. No.: 13/780,480

(22) Filed: Feb. 28, 2013

(65) Prior Publication Data

US 2013/0235950 A1 Sep. 12, 2013

Related U.S. Application Data

(63) Continuation of application No. 13/011,451, filed on Jan. 21, 2011, which is a continuation-in-part of application No. 12/372,354, filed on Feb. 17, 2009, now Pat. No. 7,876,845, and a continuation-in-part of application No. 11/720,115, filed as application No. PCT/US2006/020417 on May 25, 2006, now Pat. No. 8,050,337.

(60) Provisional application No. 61/033,114, filed on Mar. 3, 2008, provisional application No. 60/692,932, filed on Jun. 22, 2005, provisional application No. 60/698,247, filed on Jul. 11, 2005.

(51) Int. Cl.
*H04L 27/00* (2006.01)

(52) U.S. Cl.
USPC .......................................... 375/295; 327/291

(58) Field of Classification Search
USPC .......................................................... 375/295
See application file for complete search history.

(56) References Cited

U.S. PATENT DOCUMENTS

| | | | |
|---|---|---|---|
| 4,635,276 | A | 1/1987 | Karabinis |
| 5,029,184 | A | 7/1991 | Andren et al. |
| 5,117,401 | A | 5/1992 | Feintuch |
| 5,394,433 | A | 2/1995 | Bantz et al. |
| 5,559,828 | A | 9/1996 | Armstrong et al. |
| 5,848,160 | A | 12/1998 | Cai et al. |

(Continued)

FOREIGN PATENT DOCUMENTS

| | | |
|---|---|---|
| EP | 0 869 647 A2 | 10/1998 |
| EP | 1 328 071 A1 | 7/2003 |

(Continued)

OTHER PUBLICATIONS

3G Americas, "UMTS Evolution from 3GPP Release 7 to Release 8 HSPA and SAE/LTE", Jul. 2007, 89 pp.

(Continued)

*Primary Examiner* — Erin File
(74) *Attorney, Agent, or Firm* — Myers Bigel Sibley & Sajovec, P.A.

(57) ABSTRACT

Embodiments are provided wherein a bandwidth of a waveform sequence that is transmitted by a transmitter in order to convey information is varied. According to additional embodiments, a set of frequencies that is used to provide frequency content to the waveform sequence is also varied and comprises non-contiguous first and second frequency intervals wherein a third frequency interval that is between the first and second frequency intervals remains devoid of providing frequency content to the waveform sequence in order to avoid interference. The invention is relevant to 4G LTE carrier aggregation systems/methods and/or other aspects of 4G LTE. Various transmitter/receiver embodiments are disclosed including direct synthesis transmitter/receiver embodiments.

47 Claims, 9 Drawing Sheets

(56) References Cited

U.S. PATENT DOCUMENTS

| | | | |
|---|---|---|---|
| 5,966,312 | A | 10/1999 | Chen |
| 6,140,935 | A | 10/2000 | Hayton et al. |
| 6,198,730 | B1 | 3/2001 | Hogberg et al. |
| 6,243,370 | B1 | 6/2001 | Schilling |
| 6,295,461 | B1 | 9/2001 | Palmer et al. |
| 6,389,002 | B1 | 5/2002 | Schilling |
| 6,407,989 | B2 | 6/2002 | Schilling |
| 6,433,720 | B1 | 8/2002 | Libove et al. |
| 6,466,629 | B1 | 10/2002 | Isaksson et al. |
| 6,484,260 | B1 | 11/2002 | Scott et al. |
| 6,661,847 | B1 | 12/2003 | Davis et al. |
| 6,711,145 | B2 | 3/2004 | Schilling |
| 6,765,895 | B1 | 7/2004 | Watanabe |
| 6,765,969 | B1 | 7/2004 | Vook et al. |
| 6,799,141 | B1 | 9/2004 | Stoustrup et al. |
| 6,922,570 | B2 | 7/2005 | Awater et al. |
| 6,965,992 | B1 | 11/2005 | Joseph et al. |
| 7,020,125 | B2 | 3/2006 | Schilling |
| 7,020,165 | B2 | 3/2006 | Rakib et al. |
| 7,113,601 | B2 | 9/2006 | Ananda |
| 7,145,933 | B1 | 12/2006 | Szajnowski |
| 7,155,340 | B2 | 12/2006 | Churan |
| 7,218,693 | B2 | 5/2007 | Troulis |
| 7,292,627 | B2 | 11/2007 | Tzannes |
| 7,295,637 | B2 | 11/2007 | Papathanasiou et al. |
| 7,333,422 | B2 | 2/2008 | Amer |
| 7,362,695 | B2 | 4/2008 | Akahori |
| 7,362,829 | B2 | 4/2008 | Ojard |
| 7,418,053 | B2 | 8/2008 | Perlman et al. |
| 7,454,175 | B2 | 11/2008 | Karabinis |
| 7,483,672 | B2 | 1/2009 | Hart et al. |
| 7,505,522 | B1 | 3/2009 | Larsson |
| 7,561,212 | B2 | 7/2009 | Nakamura |
| 7,613,242 | B2 | 11/2009 | Bykovnikov |
| 7,616,704 | B2 | 11/2009 | Li et al. |
| 7,668,253 | B2 | 2/2010 | Hwang et al. |
| 7,733,940 | B2 | 6/2010 | Dooley et al. |
| 7,738,571 | B2 | 6/2010 | Costa et al. |
| 7,756,002 | B2 | 7/2010 | Batra et al. |
| 7,830,995 | B2 | 11/2010 | Ojard |
| 7,876,845 | B2 | 1/2011 | Karabinis |
| 7,949,032 | B1 | 5/2011 | Frost |
| 7,970,345 | B2 | 6/2011 | Cummiskey et al. |
| 7,974,176 | B2 | 7/2011 | Zheng |
| 8,050,337 | B2 | 11/2011 | Karabinis |
| 8,185,931 | B1 | 5/2012 | Reeves |
| 8,233,554 | B2 | 7/2012 | Karabinis |
| 2001/0048538 | A1 | 12/2001 | Kowalski |
| 2001/0050926 | A1 | 12/2001 | Kumar |
| 2002/0065099 | A1 | 5/2002 | Bjorndahl |
| 2002/0122499 | A1 | 9/2002 | Kannan et al. |
| 2002/0150109 | A1 | 10/2002 | Agee |
| 2002/0159533 | A1 | 10/2002 | Crawford |
| 2002/0196765 | A1 | 12/2002 | Tulino |
| 2003/0107513 | A1 | 6/2003 | Abraham et al. |
| 2003/0161385 | A1 | 8/2003 | Chang et al. |
| 2003/0228017 | A1 | 12/2003 | Beadle et al. |
| 2004/0005013 | A1 | 1/2004 | Nunally et al. |
| 2004/0039524 | A1 | 2/2004 | Adachi |
| 2004/0080315 | A1 | 4/2004 | Beevor et al. |
| 2004/0086027 | A1 | 5/2004 | Shattil |
| 2004/0095907 | A1 | 5/2004 | Agee et al. |
| 2004/0132417 | A1 | 7/2004 | Maeda et al. |
| 2004/0151109 | A1 | 8/2004 | Batra et al. |
| 2004/0170430 | A1 | 9/2004 | Gorokhov |
| 2004/0252853 | A1 | 12/2004 | Blamey et al. |
| 2005/0013238 | A1 | 1/2005 | Hansen |
| 2005/0128938 | A1 | 6/2005 | Fang et al. |
| 2005/0207385 | A1 | 9/2005 | Gorokhov et al. |
| 2005/0243938 | A1 | 11/2005 | Armstrong et al. |
| 2005/0255878 | A1 | 11/2005 | Leinonen et al. |
| 2005/0281321 | A1 | 12/2005 | Bergstrom et al. |
| 2006/0045196 | A1 | 3/2006 | Reid |
| 2006/0062320 | A1 | 3/2006 | Luz et al. |
| 2006/0062391 | A1 | 3/2006 | Lee et al. |
| 2006/0088187 | A1 | 4/2006 | Clarkson et al. |
| 2006/0171445 | A1 | 8/2006 | Batra et al. |
| 2006/0227889 | A1 | 10/2006 | Uchida et al. |
| 2006/0233147 | A1 | 10/2006 | Karabinis |
| 2006/0239334 | A1 | 10/2006 | Kwon et al. |
| 2007/0004465 | A1 | 1/2007 | Papasakellariou et al. |
| 2007/0015460 | A1 | 1/2007 | Karabinis et al. |
| 2007/0032890 | A1 | 2/2007 | Zhou et al. |
| 2007/0041311 | A1 | 2/2007 | Baum et al. |
| 2007/0053449 | A1 | 3/2007 | Adachi |
| 2007/0177680 | A1 | 8/2007 | Green et al. |
| 2007/0211786 | A1 | 9/2007 | Shattil |
| 2007/0216488 | A1 | 9/2007 | Kultgen |
| 2007/0248194 | A1 | 10/2007 | Lu |
| 2007/0271606 | A1 | 11/2007 | Amann et al. |
| 2007/0281693 | A1 | 12/2007 | Ballentin et al. |
| 2007/0285308 | A1 | 12/2007 | Bauregger et al. |
| 2008/0019341 | A1 | 1/2008 | Perlman |
| 2008/0167003 | A1 | 7/2008 | Wang et al. |
| 2008/0215888 | A1 | 9/2008 | Barriga et al. |
| 2008/0304605 | A1 | 12/2008 | Aziz et al. |
| 2009/0092041 | A1 | 4/2009 | Juang |
| 2009/0110033 | A1 | 4/2009 | Shattil |
| 2009/0168730 | A1 | 7/2009 | Baum et al. |
| 2009/0168844 | A1 | 7/2009 | Larsson |
| 2009/0252257 | A1 | 10/2009 | Sadowsky et al. |
| 2009/0279422 | A1 | 11/2009 | Fonseka et al. |
| 2009/0282472 | A1 | 11/2009 | Hamilton, II et al. |
| 2010/0002789 | A1 | 1/2010 | Karabinis |
| 2010/0024042 | A1 | 1/2010 | Motahari et al. |
| 2010/0121617 | A1 | 5/2010 | Gruener et al. |
| 2011/0123028 | A1 | 5/2011 | Karabinis |
| 2011/0219423 | A1 | 9/2011 | Aad et al. |
| 2011/0222495 | A1 | 9/2011 | Li et al. |
| 2012/0039379 | A1 | 2/2012 | Husen et al. |

FOREIGN PATENT DOCUMENTS

| | | |
|---|---|---|
| EP | 1 589 712 A2 | 10/2005 |
| WO | WO 2005/036790 A1 | 4/2005 |
| WO | WO 2007/001707 | 1/2007 |

OTHER PUBLICATIONS

3GPP/LTE Advanced, "3$^{rd}$ Generation Partnership Project: Technical Specification Group Radio Access Network; Evolved Universal Terrestrial Radio Access (E-UTRA); Physical channels and modulation (Release 10)", 3GPP TS 36.211, V10.0.0, Dec. 2010, 103 pp.

Agilent Technologies, "Introducing LTE-Advanced", Application Note, Retrieved from the internet at URL: http://cp.literature.agilent.com/litweb/pdf/5990-6706EN.pdf, Printed in USA, Mar. 8, 2011, 36 pages.

Benvenuto et al., "On the Comparison Between OFDM and Single Carrier Modulation With a DFE Using a Frequency-Domain Feedforward Filter", *IEEE Transactions on Communications*, vol. 50, No. 6, Jun. 2002, pp. 947-955.

Brüninghaus et al., "Multi-Carrier Spread Spectrum and Its Relationship to Single Carrier Transmission", *48$^{th}$ IEEE Vehicular Technology Conference*, Ottawa, Ontario, vol. 3, May 18-21, 1998, pp. 2329-2332.

Carroll "Chaotic communications that are difficult to detect" *Physical Review E* 67(2):26207-1-26207-6 (2003).

Charalabopoulos et al. "Pre-post- and balanced equalization in OFDM", Vehicular Technology Conference, 2003. VTC 2003—Fall. 2003 IEEE 58$^{th}$ Orlando, FL, USA; Oct. 6-9, 2003; Piscataway, NJ USA, IEEE, US, vol. 5, Oct. 6, 2003, pp. 3145-3148.

Dahlman E. et al. "3G Evolution HSPA and LTE for Mobile Broadband", 2008, Elsevier Ltd., Oxford US, pp. 383-387.

Dahlman E. et al., *3G Evolution: HSPA and LTE for Mobile Broadband—2d Edition*, (Burlington, MA: Academic Press, 2008), Chapter 4, pp. 43-64.

Dahlman, "3G long-term evolution", Telefon AB LM Ericsson, 2005, 36 pp.

Dinis et al., "A Multiple Access Scheme for the Uplink of Broadband Wireless Systems", *IEEE Global Telecommunications Conference*, Nov. 29-Dec. 3, 2004, vol. 6, pp. 3808-3812.

(56) References Cited

OTHER PUBLICATIONS

Dollard P.M. "On the time-bandwidth concentration of signal functions forming given geometric vector configurations", *IEEE Transactions on Information Theory*, Oct. 1964, pp. 328-338.
Ekström et al., "Technical Solutions for the 3G Long-Term Evolution", *IEEE Communications Magazine*, vol. 44, No. 3, Mar. 2006, pp. 38-45.
Falconer et al., "Frequency Domain Equalization for Single-Carrier Broadband Wireless Systems", *IEEE Communications Magazine*, vol. 40, No. 4, Apr. 2002, pp. 58-66.
Galda et al., "A Low Complexity Transmitter Structure for OFDM-FDMA Uplink Systems" *IEEE 55th Vehicular Technology Conference*, 2002, vol. 4, May 2002, pp. 1737-1741.
Gardner "Signal Interception: A Unifying Theoretical Framework for Feature Detection" *IEEE Transactions on Communications* 36(8):897-906 (1988).
Gessner et al., "LTD technology and LTE test; a deskside chat", Rohde & Schwarz, Apr. 2009, 92 pp.
Haykin, S., *Adaptive Filter Theory*, 1986, Prentice-Hall, pp. 173,301,497.
Holma et al. "LTE for UMTS-OFDMA and SC-FDMA Based Radio Access" 2009, John Wiley & Sons, Ltd., Chichester UK, pp. 76-82.
International Preliminary Report on Patentability, PCT International Application No. PCT/US09/01152, Nov. 8, 2010.
International Search Report and Written Opinion, PCT International Application No. PCT/US2009/003495, Nov. 26, 2009.
Invitation to Pay Additional Fees corresponding to International Application No. PCT/US2010/029028; Date of Mailing: Jan. 28, 2011; 11 pages.
Ishii, "Draft2 Report of 3GPP TSG RAN WG1 #40bis in Beijing (Beijing, China, Apr. 4-8, 2005)", R1-050376, Agenda Item 3, 3GPP TSG RAN WG1 Meeting #41, Athens, Greece, May 9-13, 2005, 65 pp.
Ixia "SC-FDMA Single Carrier FDMA in LTE" White Paper, Rev. A, Nov. 2009, 16 pp.
Jungnickel V. et al., "Synchronization of Cooperative Base Stations", *IEEE International Symposium on Wireless Communications Systems*; Oct. 21-24, 2008, 6 pages.
Karabinis "*Increased Capacity Communications for OFDM-Based Wireless Communications Systems/Methods/Devices*", U.S. Appl. No. 12/748,931, filed Mar. 29, 2010.
Landau H.J. & Pollak H.O., "Prolate spheroidal wave functions, Fourier analysis and uncertainty—III: The dimension of the space of essentially time- and band-limited signals", *Bell System Technical Journal*, 41, pp. 1295-1336, Jul. 1962.
Lim et al., "Channel-Dependent Scheduling of Uplink Single Carrier FDMA Systems" *IEEE 64th Vehicular Technology Conference*, Montreal, Quebec, Sep. 25-28, 2006, pp. 1-5.
Mietzner et al. "Multiple-antenna techniques for wireless communications—a comprehensive literature survey", IEEE Communications Surveys, IEEE, New York, NY, US; vol. 11, No. 2, Apr. 1, 2009, pp. 87-105.
Motorola, "R1-050971 Single Carrier Uplink Options for E-UTRA: IFDMA/DFT-SOFDM Discussion and Initial Performance Results", 3GPP TSG RAN WG1 #42, London, United Kingdom, Agenda Item: 10.3, Aug. 29-Sep. 2, 2005, 30 pp.
Motorola, "Uplink Numerology and Frame Structure", 3GPP TSG RAN1#41 Meeting, Athens, Greece, Agenda Item 13.2, May 9-13, 2005, 10 pp.
Myung et al., "Single Carrier FDMA for Uplink Wireless Transmission", *IEEE Vehicular Technology Magazine*, Sep. 2006, pp. 30-38.
Nedic, Slobodan et al. "Per-Bin DFE for Advanced OQAM-based Multi-Carrier Wireless Data Transmission Systems." *2002 International Zurich Seminar on Broadband Communications Access—Transmission—Networking*. (2002): 38-1-38-6. Print.
Nokia, "Uplink Considerations for UTRAN LTE", 3GPP TSG RAN WG1 #40bis, Beijing, China, R1-050251, Agenda Item 12.2.1, Apr. 8, 2005, 8 pp.
Notification of Transmittal of the International Search Report and the Written Opinion of the International Searching Authority, or the Declaration, International Search Report, Written Opinion of the International Searching Authority, PCT Application No. PCT/US2009/001152, May 7, 2009.
Price R. et al., "A Communication Technique for Multipath Channels", *Proceedings of the IRE*, 1958, vol. 46, pp. 555-570.
Proakis, John G. *Digital Communications*, 1983, McGraw-Hill, pp. 479.
Rumney, "3GPP LTE: Introducing Single-Carrier FDMA", *Agilent Measurement Journal*, Jan. 1, 2008, 10 pp.
Sari et al., "Transmission Techniques for Digital Terrestrial TV Broadcasting", *IEEE Communications Magazine*, vol. 33, No. 2, Feb. 1995, pp. 100-109.
Schilling D.L. et al., "Optimization of the Processing Gain on an M-ary Direct Sequence Spread Spectrum communication System", *IEEE Transactions on Communications*, vol. Com-28, No. 8, Aug. 1980, pp. 1389-1398.
Song et al. "Cross-Layer Optimization for OFDM Wireless Networks—Part II: Algorithm Development", *IEEE Transactions on Wireless Communications*, vol. 4, No. 2, Mar. 2005, pp. 625-634.
Sorger et al., "Interleaved FDMA—A New Spread-Spectrum Multiple-Access Scheme", *IEEE International Conference on Communications*, vol. 2, Jun. 7-11, 1998, pp. 1013-1017.
Tran, Thien-Toan et al., "Overview of enabling technologies for 3GPP LTE-advanced", *EURASIP Journal on Wireless Communications and Networking*, 2012, vol. 54, 12 Pages.
U.S. Appl. No. 60/692,932, filed Jun. 22, 2005, Peter D. Karabinis, "Communications systems, methods, devices and computer program products for low probability of intercept (PLI), low probability of detection (LPD) and/or low probability of exploitation (LPE) of communications information".
U.S. Appl. No. 60/698,247, filed Jul. 11, 2005, Peter D. Karabinis, "Additional communications systems, methods, devices and/or computer program products for low probability of intercept (PLI), low probability of detection (LPD) and/or low probability of exploitation (LPE) of communications information and/or minimum interference communications".
U.S. Appl. No. 61/033,114, filed Mar. 3, 2008, Peter D. Karabinis, "Next Generation (Xg) Chipless Spread-Spectrum Communications (Cssc)".
Widrow B., Stearns S.D., *Adaptive Signal Processing*, 1985, Prentice-Hall, Inc., pp. 183.
Wikipedia contributors, "Orthogonal frequency-division multiplexing," *Wikipedia, The Free Encyclopedia*, http://en.wikipedia.org/w/index.php?title=Orthogonal_frequency-division_multiplexing&oldid=489673844 (accessed Apr. 25, 2012).
Zhang et al., "A Novel-Direct Waveform Synthesis Technique With Carrier Frequency Programmable", *IEEE Wireless Communications and Networking Conference*, 2002, pp. 150-154.
Zhang H. et al., "Base Station Cooperation for Multiuser MIMO: Joint Transmission and BS Selection", *2004 Conference on Information Sciences and Systems, Princeton University*, Mar. 17-19, 2004, 6 pages.

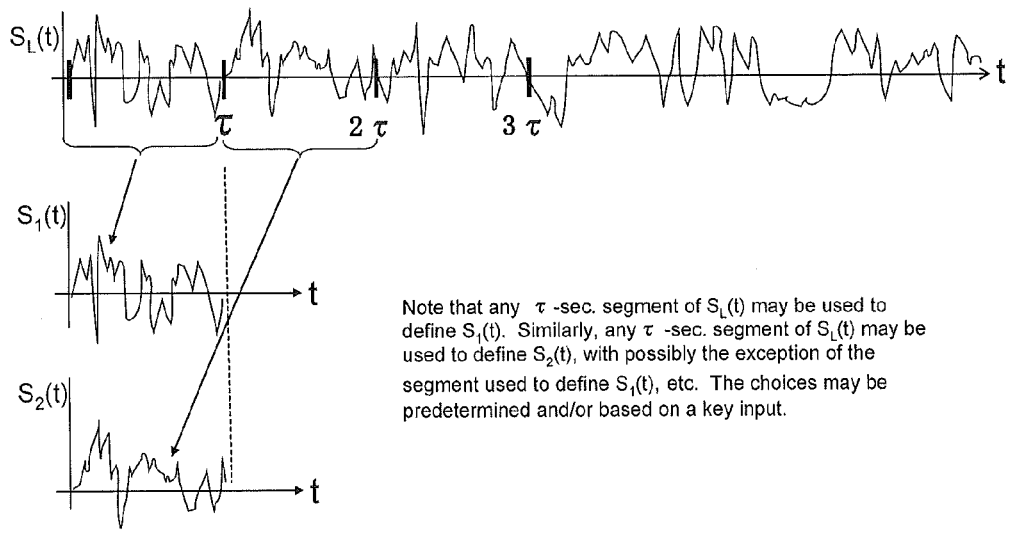

Note that any $\tau$-sec. segment of $S_L(t)$ may be used to define $S_1(t)$. Similarly, any $\tau$-sec. segment of $S_L(t)$ may be used to define $S_2(t)$, with possibly the exception of the segment used to define $S_1(t)$, etc. The choices may be predetermined and/or based on a key input.

Figure 3

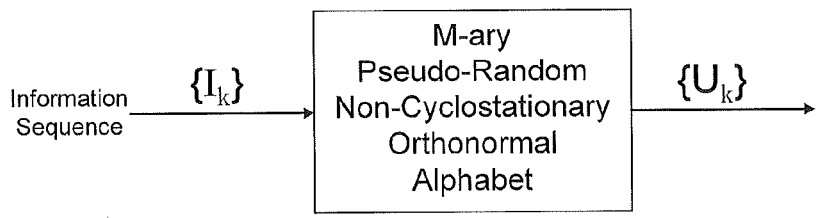

$$I_k \in \{I_1, I_2, \ldots I_M\} \text{ for } \forall k$$

$$U_k \in \{U_1, U_2, \ldots, U_M\}$$

$$\{I_k\} = \sum_k I_k \, \delta(t - k\tau)$$

or $$\{I_k\} = \sum I_k \, \delta(t - \tau_k)$$

Random variable

Figure 4

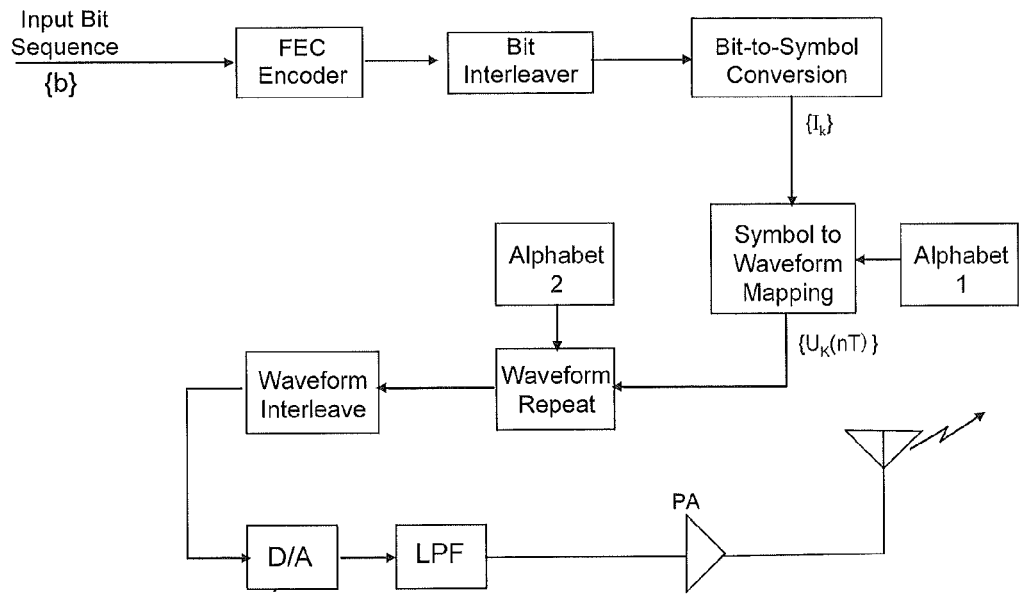
Figure 7
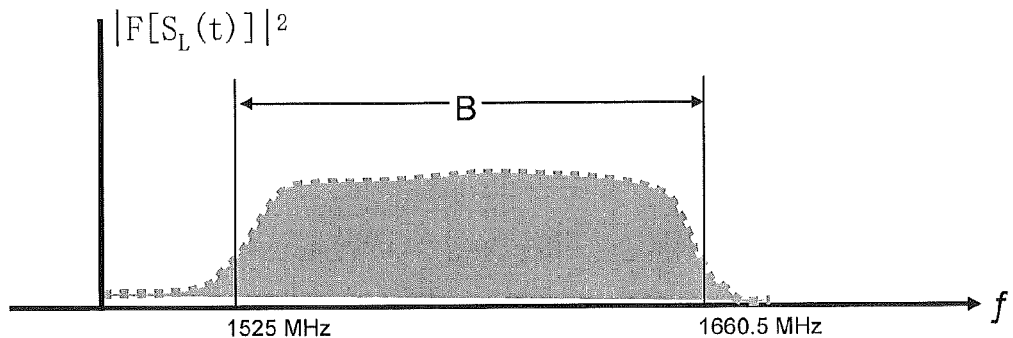
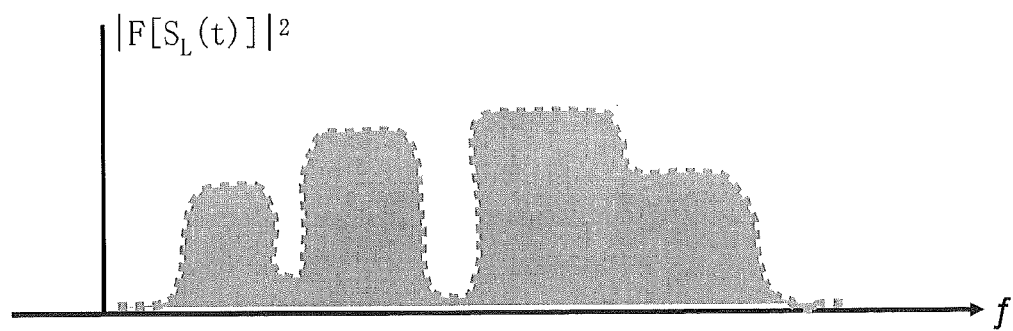
Figure 8

$f_{CLK} = 1/(\alpha \tau); \quad \alpha < 1; \quad \alpha \tau \leq T$

SYSTEMS/METHODS OF ADAPTIVELY VARYING A BANDWIDTH AND/OR FREQUENCY CONTENT OF COMMUNICATIONS

CLAIM FOR PRIORITY

This application is a continuation of U.S. patent application Ser. No. 13/011,451, filed Jan. 21, 2011, entitled Systems and/or Methods of Increased Privacy Wireless Communications, which itself is a continuation-in-part of U.S. patent application Ser. No. 12/372,354, filed Feb. 17, 2009, entitled Wireless Communications Systems and/or Methods Providing Low Interference, High Privacy and/or Cognitive Flexibility, which itself claims priority to U.S. Provisional Application No. 61/033,114, filed Mar. 3, 2008, entitled Next Generation (XG) Chipless Spread-Spectrum Communications (CSSC), and is a continuation-in-part (CIP) of U.S. application Ser. No. 11/720,115, filed May 24, 2007, entitled Systems, Methods, Devices and/or Computer Program Products For Providing Communications Devoid of Cyclostationary Features, which is a 35 U.S.C. §371 national stage application of PCT Application No. PCT/US2006/020417, filed on May 25, 2006, which claims priority to U.S. Provisional Patent Application No. 60/692,932, filed Jun. 22, 2005, entitled Communications Systems, Methods, Devices and Computer Program Products for Low Probability of Intercept (LPI), Low Probability of Detection (LPD) and/or Low Probability of Exploitation (LPE) of Communications Information, and also claims priority to U.S. Provisional Patent Application No. 60/698,247, filed Jul. 11, 2005, entitled Additional Communications Systems, Methods, Devices and Computer Program Products for Low Probability of Intercept (LPI), Low Probability of Detection (LPD) and/or Low Probability of Exploitation (LPE) of Communications Information and/or Minimum Interference Communications, the entirety of all of which are incorporated herein by reference. The above-referenced PCT International Application was published in the English language as International Publication No. WO 2007/001707.

FIELD

This invention relates to communications systems and methods, and more specifically to wireless communications systems and methods.

BACKGROUND

Wireless communications systems and methods are increasingly being used for voice, data and/or multimedia communications. As the use of these systems/methods continues to increase, available bandwidths may limit the ability to transmit voice/data/multimedia content.

SUMMARY

Embodiments are provided wherein a bandwidth of a waveform sequence that is transmitted by a transmitter in order to convey information is varied. According to additional embodiments, a set of frequencies that is used to provide frequency content to the waveform sequence is also varied and comprises non-contiguous first and second frequency intervals wherein a third frequency interval that is between the first and second frequency intervals remains devoid of providing frequency content to the waveform sequence in order to avoid interference. The invention is relevant to 4G LTE carrier aggregation systems/methods and/or other aspects of 4G LTE. Various transmitter/receiver embodiments are disclosed including direct synthesis transmitter/receiver embodiments.

BRIEF DESCRIPTION OF THE DRAWINGS

FIG. 3 is a schematic illustration of waveform generation according to additional embodiments of the present invention.

FIG. 4 is a schematic illustration of further functions of a transmitter according to further embodiments of the present invention.

FIG. 7 is a schematic illustration of further functions of a transmitter according to further embodiments of the present invention.

FIG. 8 is a schematic illustration of spectrum used by a transmitter according to embodiments of the present invention.

DETAILED DESCRIPTION

Figure 1:
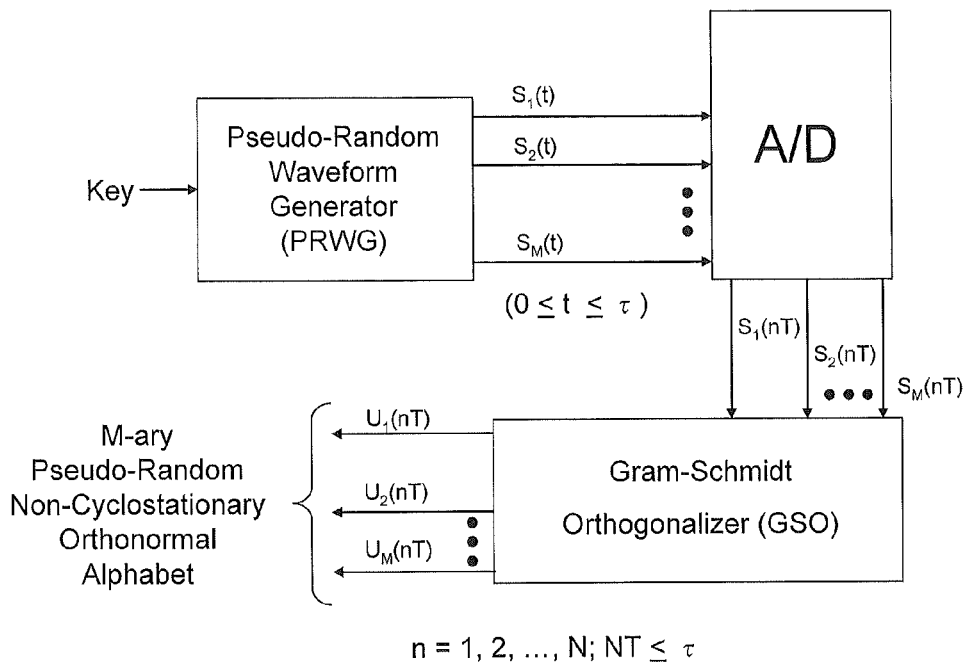
FIG. 1 is a schematic illustration of functions of a transmitter according to embodiments of the present invention.

A wireless communications system configured for Low Probability of Intercept (LPI), Low Probability of Detection (LPD) and/or Low Probability of Exploitation (LPE) communications may use waveforms substantially void of a cyclostationary signature to improve a LPI/LPD/LPE property. It is known that, in general, a set of M independent "seed" waveforms that satisfy a time-bandwidth constraint may be used via a Gram-Schmidt Orthogonalization (GSO) procedure to generate M orthonormal functions. In accordance with exemplary embodiments of the present invention, the M seed waveforms may, for example, be chosen from a band-limited Gaussian-distributed process (such as, for example, Gaussian-distributed pseudo-random noise) and may be used to generate, via an orthogonalization operation, such as, for example, a GSO, a corresponding set of M Gaussian-distributed orthonormal functions substantially void of a cyclostationary property. The set of M Gaussian-distributed orthonormal functions may be used in a communications system to define a signaling alphabet of a transmitter of the communications system (and a corresponding matched filter bank of a receiver of the communications system) to thereby reduce or eliminate a cyclostationary signature of a transmitted communications waveform and thus increase a covertness measure of the communications system. The set of M Gaussian-distributed orthonormal functions may be updated, modified and/or changed as often as necessary to further increase and/or maximize a covertness measure of the communications system. A receiver of the communications system may be equipped with substantially the same algorithm(s) that are used by the transmitter of the communications system and the receiver may be substantially synchronized with the transmitter to thereby re-create and use at the receiver the M Gaussian-distributed orthonormal functions for detection of communications information. The set of M orthonormal functions may, in some embodiments, be a set of orthogonal but not necessarily orthonormal functions. In further embodiments, the set of M orthonormal functions may be non-Gaussian distributed and may be, for example, uniformly distributed, Rayleigh distributed and/or distributed in accordance with any other known (continuous and/or discrete) and/or arbitrary distribution. In still further embodiments of the invention, different functions/elements of an M-ary orthonormal and/or orthogonal signaling alphabet may be differently distributed.

Known systems and/or methods of LPI/LPD/LPE and/or Jam Resistant (JR) Burst Communications (BURSTCOMM) may combine, in general, hybrid spread-spectrum waveforms comprising Frequency-Hopping (FH), Direct Sequence Pseudo-Noise (DSPN) spreading and/or Time-Hopping (TH) to increase covertness and/or resistance to jamming. Transmitting a FH/DSPN spread-spectrum waveform in pseudo-random short bursts using, for example, a TH technique, may, for example, reduce an interceptor's ability to integrate sufficient energy to trigger a delectability threshold associated with a radiometer that the interceptor may be using as a means of signal detection/identification. It is known that a radiometric approach to signal detection/identification may yield a suboptimum and/or unsatisfactory performance measure when attempting to detect/identify/exploit a FH/DSPN/TH spread-spectrum communications signal in a changing noise and/or interference environment. An analysis by Gardner, however, has shown that a cyclic feature of a communications waveform may advantageously be exploited by an interceptor even when a radiometric-based method fails to detect the communications waveform due to a background noise/interference level and/or a signal energy reaching the interceptor's receiver being insufficient over the interceptor's radiometric integration time (see W. A. Gardner, "*Signal Interception: A Unifying Theoretical Framework for Feature Detection*," IEEE Transactions on Communications, Vol. 36, No. 8, August 1988). It is, therefore, desirable to be able to communicate information using waveforms that do not substantially include a cyclostationary signature in order to further reduce the probability of intercept/detection/exploitation of a communications system/waveform that is intended for LPI/LPD/LPE communications.

There are at least two potential advantages associated with signal detection, identification, interception and/or exploitation based on cyclic spectral analysis compared with the energy detection (radiometric) method: (1) A cyclic signal feature (i.e., chip rate and/or symbol rate) may be discretely distributed even if a signal has continuous distribution in a power spectrum. This implies that signals that may have overlapping and/or interfering features in a power spectrum may have a non-overlapping and distinguishable feature in terms of a cyclic characteristic. (2) A cyclic signal feature associated with a signal's cyclostationary property, may be identified via a "cyclic periodogram." The cyclic periodogram of a signal is a quantity that may be evaluated from time-domain samples of the signal, a frequency-domain mapping such as, for example, a Fast Fourier Transform (FFT), and/or discrete autocorrelation operations. Since very large point FFTs and/or autocorrelation operations may be implemented using Very Large Scale Integration (VLSI) technologies, Digital Signal Processors (DSPs) and/or other modern technologies, a receiver of an interceptor may be configured to perform signal Detection, Identification, Interception and/or Exploitation (D/I/I/E) based on cyclic feature detection processing.

Given the potential limitation(s) of the radiometric approach and the potential advantage(s) of cyclic feature detection technique(s) it is reasonable to expect that a sophisticated interceptor may be equipped with a receiver based on cyclic feature detection processing. It is, therefore, of potential interest and potential importance to develop communications systems capable of communicating information void of cyclostationary properties/signatures to thereby render cyclic feature detection processing by an interceptor substantially ineffective.

FIG. 1 illustrates embodiments of generating a communications alphabet comprising M distinct pseudo-random, non-cyclostationary, orthogonal and/or orthonormal waveforms. As illustrated in FIG. 1, responsive to a "key" input (such as, for example, a TRANsmissions SECurity (TRANSEC), a COMMunications SECurity (COMMSEC) and/or any other key input), a Pseudo-Random Waveform Generator (PRWG) may be used to generate a set of M distinct pseudo-random waveforms, which may, according to some embodiments of the invention, represent M ensemble elements of a Gaussian-distributed random process. The M distinct pseudo-random waveforms (e.g., the M ensemble elements) may be denoted as $\{S(t)\}=\{S_1(t), S_2(t), \ldots, S_M(t)\}$; $0 \leq t \leq \tau$. The set of waveforms $\{S(t)\}$ may be a band-limited set of waveforms having a one-sided bandwidth less than or equal to B Hz. As such, a number of distinct orthogonal and/or orthonormal waveforms that may be generated from the set $\{S(t)\}$ may, in accordance with established Theorems, be upper-bounded by $G\tau B$, where $C \geq 2$ (see, for example, P. M. Dollard, "*On the time-bandwidth concentration of signal functions forming given geometric vector configurations*," IEEE Transactions on Information Theory, IT-10, pp. 328-338, October 1964; also see H. J. Landau and H. O. Pollak, "*Prolate spheroidal wave functions, Fourier analysis and uncertainty—III: The dimension of the space of essentially time-and band-limited signals*," BSTJ, 41, pp. 1295-1336, July 1962).

Figure 2:
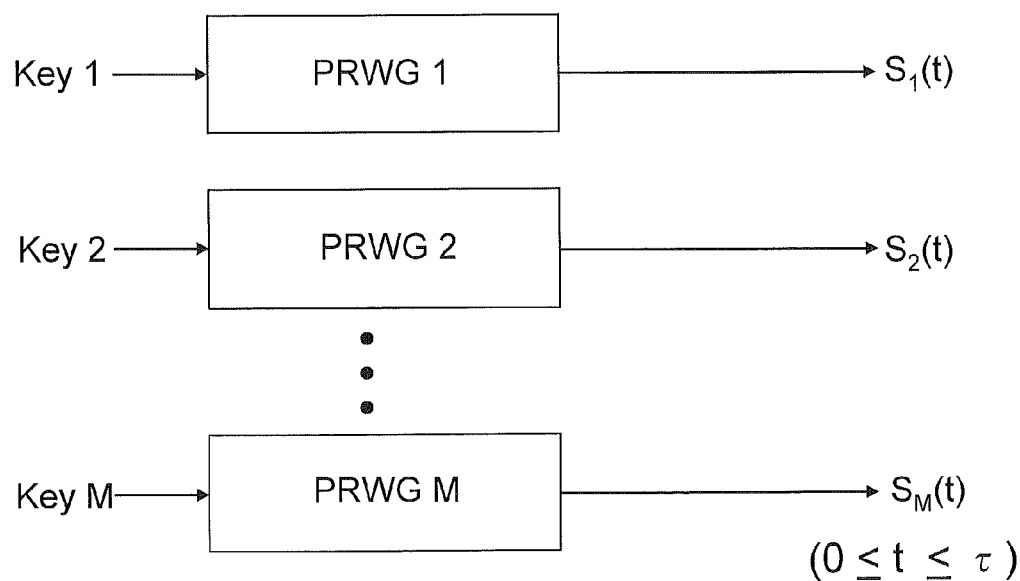
FIG. 2 is a schematic illustration of further functions of a transmitter according to further embodiments of the present invention.

In accordance with some embodiments of the present invention, the $j^{th}$ element of the set of waveforms $\{S(t)\}$, $S_j(t)$; $j=1, 2, \ldots, M$; may be generated by a respective $j^{th}$ PRWG in response to a respective $j^{th}$ key input, as illustrated in FIG. 2. In some embodiments according to FIG. 2, each of the PRWG is the same PRWG and each key differs relative to each other key. In other embodiments, each key is the same key and each PRWG differs relative to each other PRWG. In further embodiments of FIG. 2, each key differs relative to each other key and each PRWG also differs relative to each other PRWG. Other combinations and subcombinations of these embodiments may be provided. In still other embodiments, a single PRWG and a single key may be used to generate a "long" waveform $S_L(t)$ which may be segmented into M overlapping and/or non-overlapping components to form a set of waveforms $\{S(t)\}$, as illustrated in FIG. 3. In some embodiments, a new set of waveforms $\{S(t)\}$ may be formed periodically, non-periodically, periodically over certain periods of time and/or periodically but with a jitter imposed on a periodicity interval, responsive one or more Time-of-Day (TOD) value(s), as may, for example, be derived from processing of Global Positioning System (GPS) signals, and/or following the transmission of a measure of at least one of the elements of $\{S(t)\}$. In some embodiments, a processor may be operatively configured as a background operation, generating new sets of waveforms $\{S(t)\}$, and storing the new sets of waveforms $\{S(t)\}$ in memory to be accessed and used as needed. In further embodiments, a used set of waveforms $\{S(t)\}$ may be discarded and not used again, whereas in other embodiments, a used set of waveforms $\{S(t)\}$ may be placed in memory to be used again at a later time. In some embodiments, some sets of waveforms $\{S(t)\}$ are used once and then discarded, other sets of waveforms $\{S(t)\}$ are not used at all, and still other sets of waveforms $\{S(t)\}$ are used more than once. Finally, in some embodiments, the waveform duration $\tau$ and/or the waveform bandwidth B may vary between at least two sets of waveforms and/or between two elements of a given set of waveforms.

Still referring to FIG. 1, the set of substantially continuous-time waveforms $\{S(t)\}=\{S_1(t), S_2(t), \ldots, S_M(t)\}$; $0 \leq t \leq \tau$; may be transformed from a substantially continuous-time representation to a substantially discrete-time representation using, for example, one or more Analog-to-Digital (A/D) converters and/or one or more Sample-and-Hold (S/H) circuits, to generate a corresponding substantially discrete-time set of waveforms $\{S(nT)\}=\{S_1(nT), S_2(nT), \ldots, S_M(nT)\}$; $n=1, 2, \ldots, N$; $nT \leq \tau$. A Gram-Schmidt orthogonalizer and/or orthonormalizer and/or any other orthogonalizer and/or orthonormalizer, may then be used, as illustrated in FIG. 1, to generate a set of waveforms $\{U(nT)\}=\{U_1(nT), U_2(nT), \ldots, U_M(nT)\}$; $n=1, 2, \ldots, N$; $nT \leq \tau$ that are orthogonal and/or orthonormal to one another. The GSO and/or other orthogonalization and/or orthonormalization procedure(s) are known to those skilled in the art and need not be described further herein (see, for example, Simon Haykin, "*Adaptive Filter Theory*," at 173, 301, 497; 1986 by Prentice-Hall; and Bernard Widrow and Samuel D. Stearns "*Adaptive Signal Processing*," at 183; 1985 by Prentice-Hall, Inc.). It will be understood that the sampling interval T may be chosen in accordance with Nyquist sampling theory to thereby preserve by the discrete-time waveforms $\{S(nT)\}$ substantially all of the information contained in the continuous-time waveforms $\{S(t)\}$. It will also be understood that, in some embodiments of the invention, the sampling interval T may be allowed to vary over the duration $\tau$ of one waveform, between different waveforms of a given set of waveforms and/or between different sets of waveforms. Furthermore, the waveform duration $\tau$ may be allowed to vary, in some embodiments, between different waveforms of a given set of waveforms and/or between different sets of waveforms.

The set $\{U(nT)\}=\{U_1(nT), U_2(nT), \ldots, U_M(nT)\}$; $n=1, 2, \ldots, N$; $NT \leq \tau$, may be used, in some embodiments of the present invention, to define an M-ary pseudo-random and non-cyclostationary alphabet. As illustrated in FIG. 4, an information symbol $I_k$, occurring at a discrete time k (for example, at $t=kT$ or, more generally, if the discrete time epochs/intervals are variable, at $t=\tau_k$), and having one of M possible information values, $\{I_1, I_2, \ldots, I_M\}$, may be mapped onto one of the M waveforms of the M-ary alphabet $\{U_1(nT), U_2(nT), \ldots, U_M(nT)\}$; $n=1, 2, \ldots, N$; $NT \leq \tau$. For example, in some embodiments, if $I_k=I_2$, then during the $k^{th}$ signaling interval the waveform $U_2(nT)$ may be transmitted; $n=1, 2, \ldots, N$; $NT \leq \tau$. It will be understood that transmitting the waveform $U_2(nT)$ comprises transmitting substantially all of the elements (samples) of the waveform $U_2(nT)$ wherein substantially all of the elements (samples) of the waveform $U_2(nT)$ means transmitting $U_2(T), U_2(2T), \ldots,$ and $U_2(NT)$. Furthermore, it will be understood that any unambiguous mapping between the M possible information values of $I_k$ and the M distinct waveforms of the M-ary alphabet, $\{U_1(nT), U_2(nT), \ldots, U_M(nT)\}$, may be used to communicate information to a receiver (destination) provided that the receiver also has knowledge of the mapping. It will also be appreciated that the ordering or indexing of the alphabet elements and the unambiguous mapping between the M possible information values of $I_k$ and the M distinct waveforms of the M-ary alphabet may be arbitrary, as long as both transmitter (source) and receiver (destination) have knowledge of the ordering and mapping.

In some embodiments of the invention, the information symbol $I_k$, may be constrained to only two possible values (binary system). In such embodiments of the invention, the M-ary alphabet may be a binary (M=2) alphabet comprising only two elements, such as, for example, $\{U_1(nT), U_2(nT)\}$. In other embodiments of the invention, while an information symbol, $I_k$, is allowed to take on one of M distinct values (M≥2) the alphabet comprises more than M distinct orthogonal/orthonormal waveforms $\{U_1(nT), U_2(nT), \ldots, U_L(nT)\}$; L>M to thereby increase a distance between a set of M alphabet elements that are chosen and used to communicate information and thus allow an improvement of a communications performance measure such as, for example, an error rate, a propagations distance and/or a transmitted power level. It will be understood that in some embodiments, the number of distinct values that may be made available to an information symbol to thereby allow the information symbol to communicate one or more bits of information, may be reduced or increased responsive to a channel state such as, for example an attenuation, a propagation distance and/or an interference level. In further embodiments, the number of distinct elements comprising the orthogonal/orthonormal alphabet may also change responsive to a channel state. In some embodiments, as a number of information symbol states (values) decreases, a number of distinct elements comprising the orthogonal/orthonormal alphabet increases.

Figure 5:
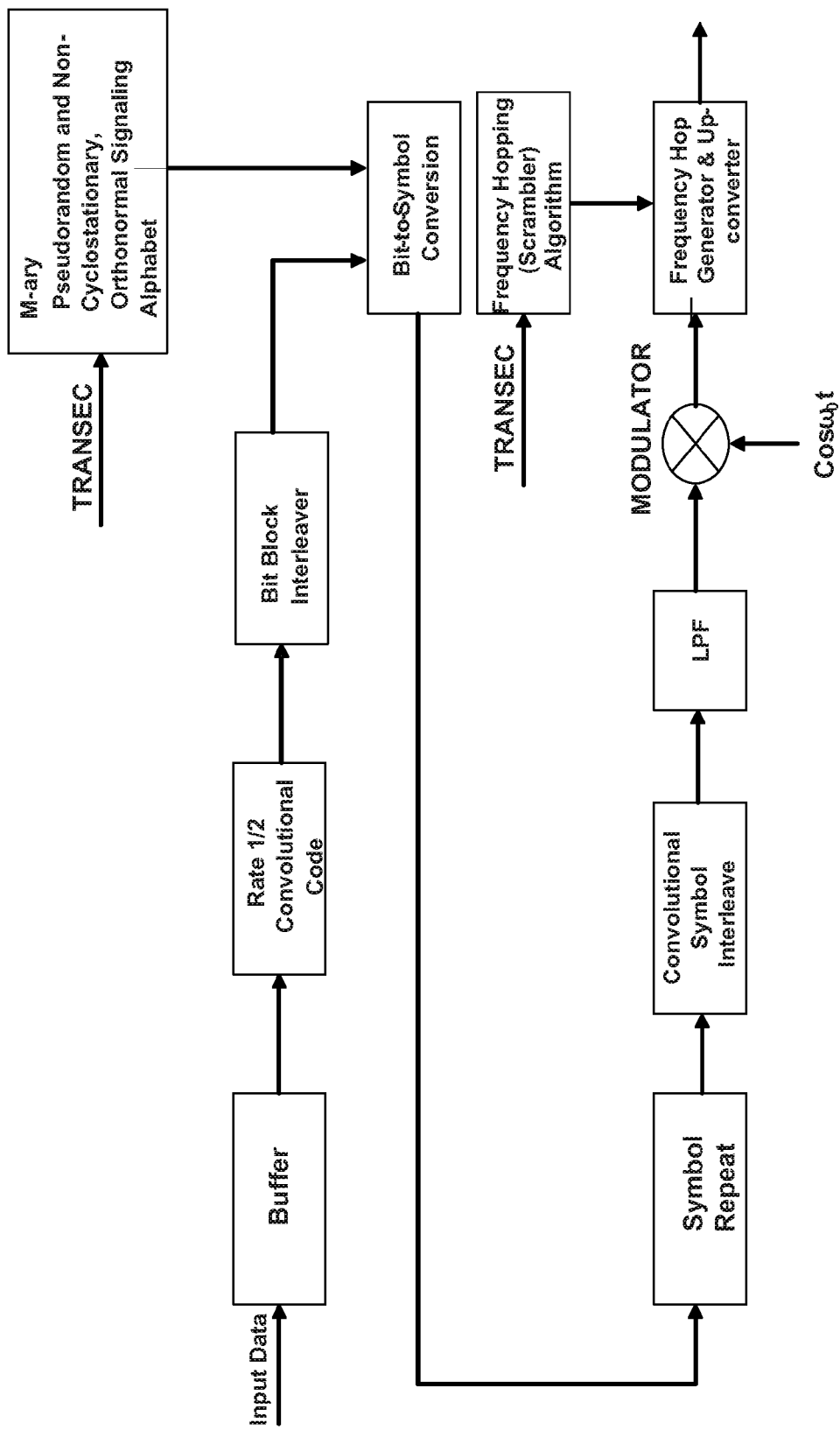
FIG. 5 is a schematic illustration of additional functions of a transmitter according to additional embodiments of the present invention.

It will be understood that at least some conventional transmitter functions comprising, for example, Forward Error Correction (FEC) encoding, interleaving, data repetition, filtering, amplification, modulation, frequency translation, scrambling, frequency hopping, etc., although not shown in FIGS. 1 through 4, may also be used in some embodiments of the present invention to define an overall transmitter chain. At least some of these conventional transmitter functions may be used, in some embodiments, in combination with at least some of the signal processing functions of FIGS. 1 through 4, to specify an overall transmitter signal processing chain. For example, an information bit sequence may be FEC encoded using, for example, a convolutional encoder, interleaved and/or bit-to-symbol converted to define a sequence of information symbols, $\{I_k\}$. The sequence of information symbols, $\{I_k\}$, may then be mapped onto a waveform sequence $\{U_k\}$, as illustrated in FIG. 4. At least some, and in some embodiments all, of the elements of the waveform sequence $\{U_k\}$ may then be repeated, at least once, to increase a redundancy measure, interleaved, filtered, frequency translated, amplified and/or frequency-hopped, for example, (not necessarily in that order) prior to being radiated by an antenna of the transmitter. An exemplary embodiment of a transmitter comprising conventional signal functions in combination with at least some of the signal processing functions of FIGS. 1 through 4, to specify an overall transmitter signal processing chain, is illustrated in FIG. 5.

Figure 6:
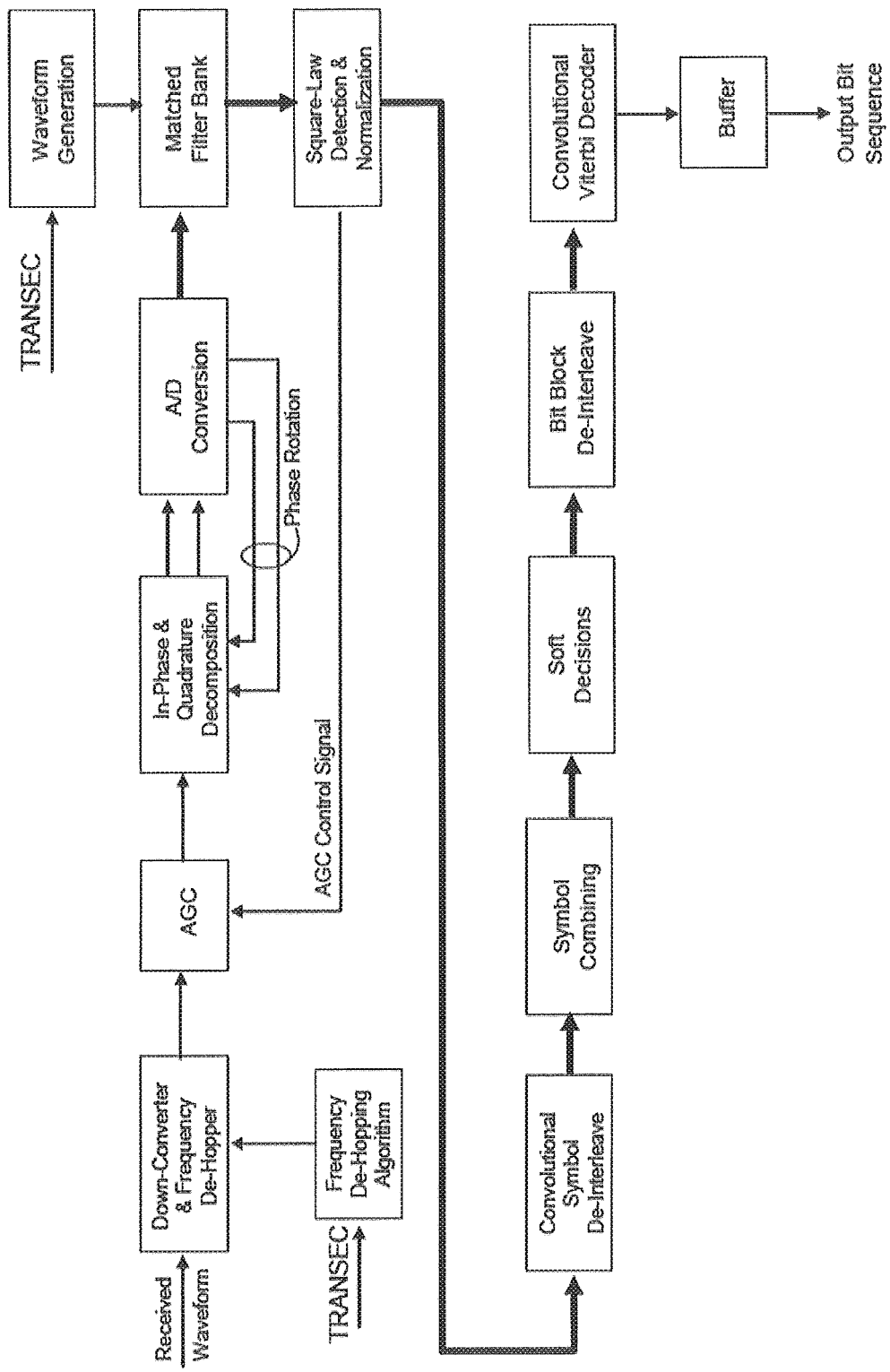
FIG. 6 is a schematic illustration of functions of a receiver according to embodiments of the present invention.

A receiver (destination) that is configured to receive communications information from a transmitter (source) comprising functions of FIGS. 1 through 4, may advantageously be equipped with sufficient information to generate a matched filter bank corresponding (and responsive) to the M-ary alphabet $\{U_1(nT), U_2(nT), \ldots, U_M(nT)\}$ of FIG. 4. Such a receiver may be substantially synchronized with one or more transmitters using, for example, GPS signal processing. Substantial relative synchronism between a receiver and at least one transmitter may be used and/or may be essential in order to reliably generate and/or update at the receiver the M-ary alphabet functions $\{U_1(nT), U_2(nT), \ldots, U_M(nT)\}$ and/or the matched filter bank in coordination with one or more transmitters (responsively to TOD and/or key values) to thereby provide the receiver with substantial optimum reception capability. In some embodiments of the invention, all transmitters and receivers are substantially synchronized using GPS signal processing. It will be understood that a receiver may be provided with the appropriate key sequence(s) (e.g., TRANSEC) and the appropriate signal processing algorithms to thereby responsively form and/or update the M-ary alphabet functions and/or the matched filter bank. It will also be understood that a receiver may also be configured with an inverse of conventional transmitter functions that may be used by a transmitter. For example, if, in some embodiments, a transmitter is configured with scrambling, interleaving of data and frequency hopping, then a receiver may be configured with the inverse operations of de-scrambling, de-interleaving of data and frequency de-hopping. An exemplary embodiment of a receiver, which may correspond to the exemplary transmitter embodiment of FIG. 5, is illustrated in FIG. 6.

FIG. 7 illustrates elements of a communications transmitter according to further embodiments of the invention. As shown in FIG. 7, following conventional operations of Forward Error Correction (FEC) encoding, bit interleaving and bit-to-symbol conversion (performed on an input bit sequence $\{b\}$ to thereby form an information symbol sequence $\{I_k\}$), the information symbol sequence $\{I_k\}$ is mapped onto a non-cyclostationary waveform sequence $\{U_k(nT)\}$ using a first M-ary non-cyclostationary orthonormal alphabet (Alphabet 1). An element of $\{U_k(nT)\}$ may then be repeated (at least once), as illustrated in FIG. 7, using a second M-ary non-cyclostationary orthonormal alphabet (Alphabet 2), interleaved, transformed to the continuous-time domain representation, filtered, amplified (not necessarily in that order) and transmitted. The repeat of an element of $\{U_k(nT)\}$ may be performed using a different alphabet (Alphabet 2) in order to reduce or eliminate a cyclostationary feature/signature in the transmitted waveform. For at least the same reason, the at least two alphabets of FIG. 7 may be replaced by new alphabets following the transmission of a predetermined number of waveform symbols. In some embodiments, the predetermined number of waveform symbols is one. As stated earlier, a large reservoir of alphabets may be available and new alphabet choices may be made following the transmission of the predetermined number of waveform symbols and/or at predetermined TOD values.

According to some embodiments of the invention, the M-ary non-cyclostationary orthonormal alphabet waveforms may be broadband waveforms as illustrated in FIG. 8. FIG. 8 illustrates a power spectral density of a broadband waveform defining the M-ary non-cyclostationary orthonormal alphabet (such as, for example, waveform $S_L(t)$ of FIG. 3), over frequencies of, for example, an L-band (e.g., from about 1525 MHz to about 1660.5 MHz). However, FIG. 8 is for illustrative purposes only and the power spectral density of $S_L(t)$ and/or any other set of waveforms used to define the M-ary non-cyclostationary orthonormal alphabet may be chosen to exist over any other frequency range and/or interval(s). In some embodiments, different alphabets may be defined over different frequency ranges/intervals (this feature may provide intrinsic frequency hopping capability). As is further illustrated in FIG. 8 (second trace), certain frequency intervals that warrant protection (or additional protection) from interference, such as, for example, a GPS frequency interval, may be substantially excluded from providing frequency content for the generation of the M-ary non-cyclostationary orthonormal alphabets. It will be appreciated that the transmitter embodiment of FIG. 7 illustrates a "direct synthesis" transmitter in that the transmitter directly synthesizes a transmitted waveform, without resorting to up-conversion and/or carrier modulation. This aspect may further enhance the LPI/LPD/LPE feature(s) of a communications system.

Figure 9:
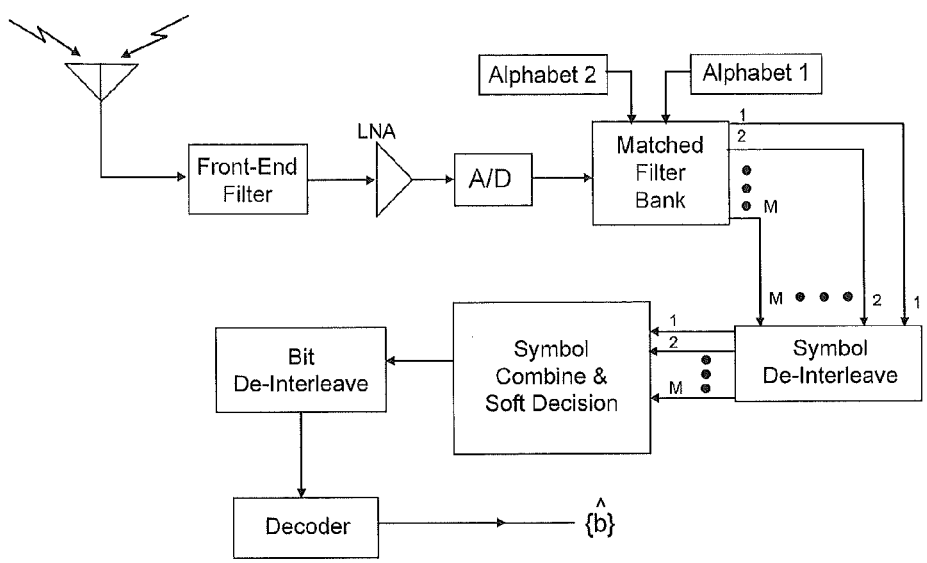
FIG. 9 is a schematic illustration of further functions of a receiver according to further embodiments of the present invention.

A receiver (destination) that is configured to receive communications information from a transmitter (source) comprising the functionality of FIG. 7, may be provided with sufficient information to generate a matched filter bank corresponding to the transmitter waveform set of the M-ary alphabet $\{U_1(nT), U_2(nT), \ldots, U_M(nT)\}$. Such a receiver may be substantially synchronized with the transmitter using GPS-derived TOD. FIG. 9 illustrates elements of such a receiver, according to exemplary embodiments of the present invention. As illustrated in FIG. 9, following front-end filtering, amplification and Analog-to-Digital and/or discrete-time (A/D) conversion of a received waveform, a matched-filter bank, comprising matched filters reflecting the TOD-dependent waveform alphabets used by the transmitter, is used for detection of information. The receiver may have information regarding what waveform alphabet the transmitter may have used as a function of TOD. As such, the receiver, operating in substantial TOD synchronism with the transmitter, may know to configure the matched-filter bank with the appropriate (TOD-dependent) matched filter components to thereby achieve optimum or near optimum signal detection. Following matched-filter detection, symbol de-interleaving and symbol repeat combination, soft decisions of a received symbol sequence may be made, followed by bit de-interleaving and bit decoding, to thereby generate an estimate of a transmitted information bit sequence.

In accordance with some embodiments of the invention, a receiver architecture, such as, for example, the receiver architecture illustrated in FIG. 9, may further configure a matched filter bank to include a "rake" matched filter architecture, to thereby resolve multipath components and increase or maximize a desired received signal energy subject to multipath fading channels. Owing to the broadband nature of the communications alphabets, in accordance with some embodiments of the invention, a significant number of multipath components may be resolvable. Rake matched filter architectures are known to those skilled in the art and need not be described further herein (see, for example, John G. Proakis, "*Digital Communications,*" McGraw-Hill, 1983, section 7.5 starting at 479; also see R. Price and P. E. Green Jr. "*A Communication Technique for Multipath Channels,*" Proc. IRE, Vol. 46, pp. 555-570, March 1958).

Figure 10:
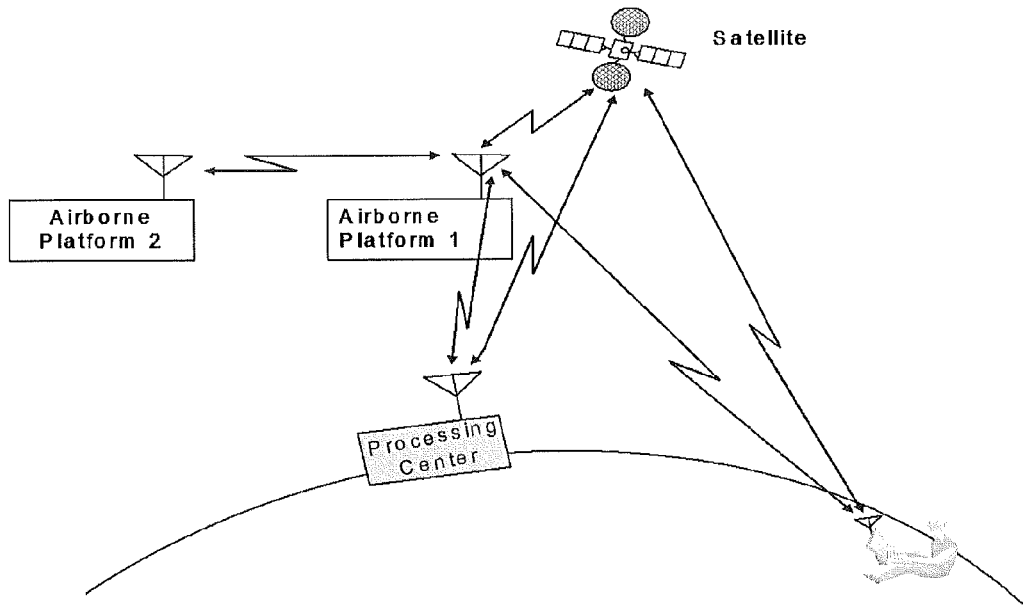
FIG. 10 is a schematic illustration of a communications system based upon one or more transmitters and one or more receivers according to further embodiments of the present invention.
Figure 11:
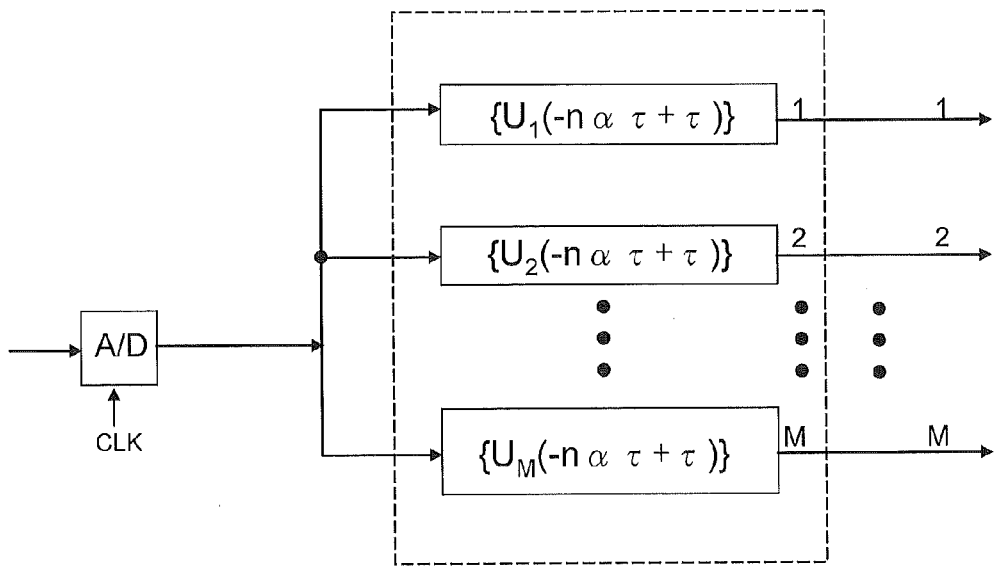
FIGS. 11 through 14 illustrate functions of a receiver according to further embodiments of the present invention.
Figure 12:
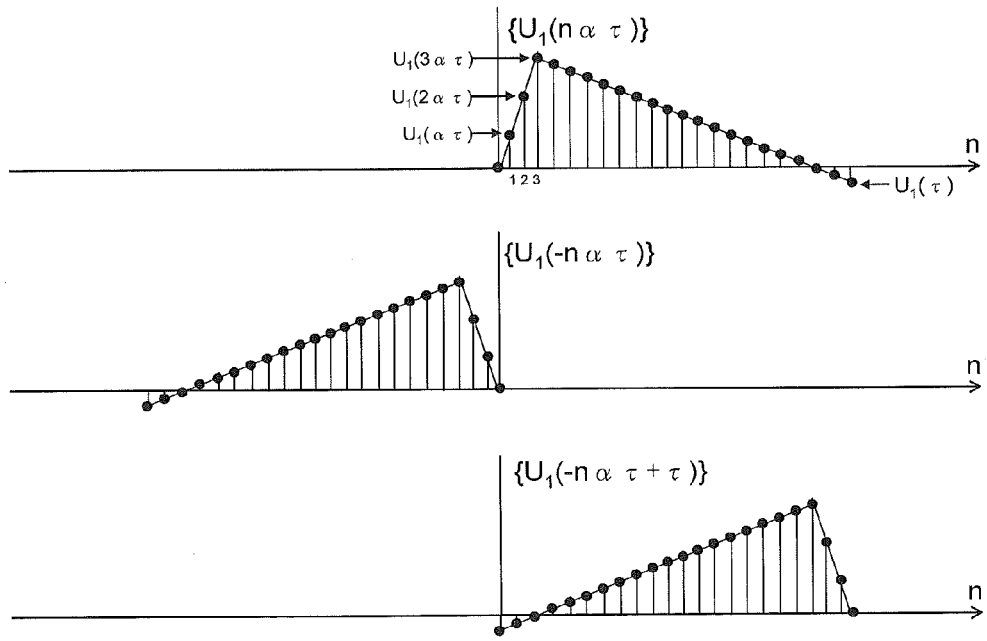
Figure 13:
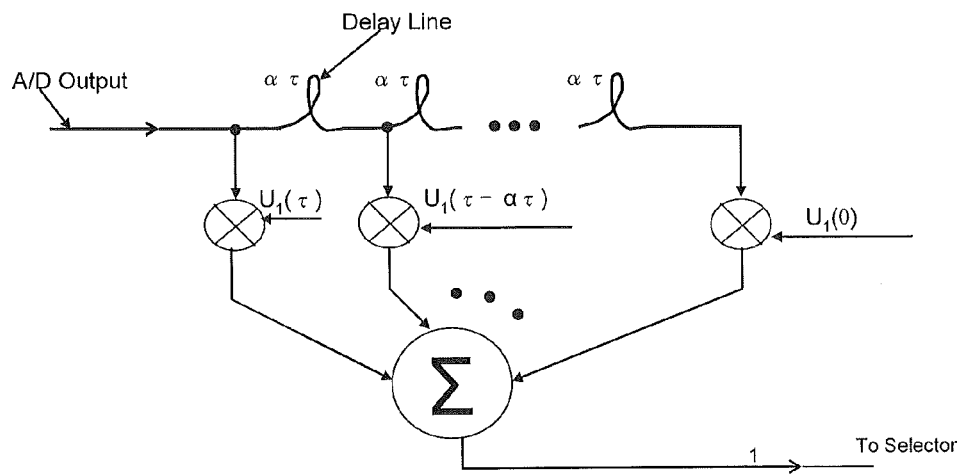
Figure 14:
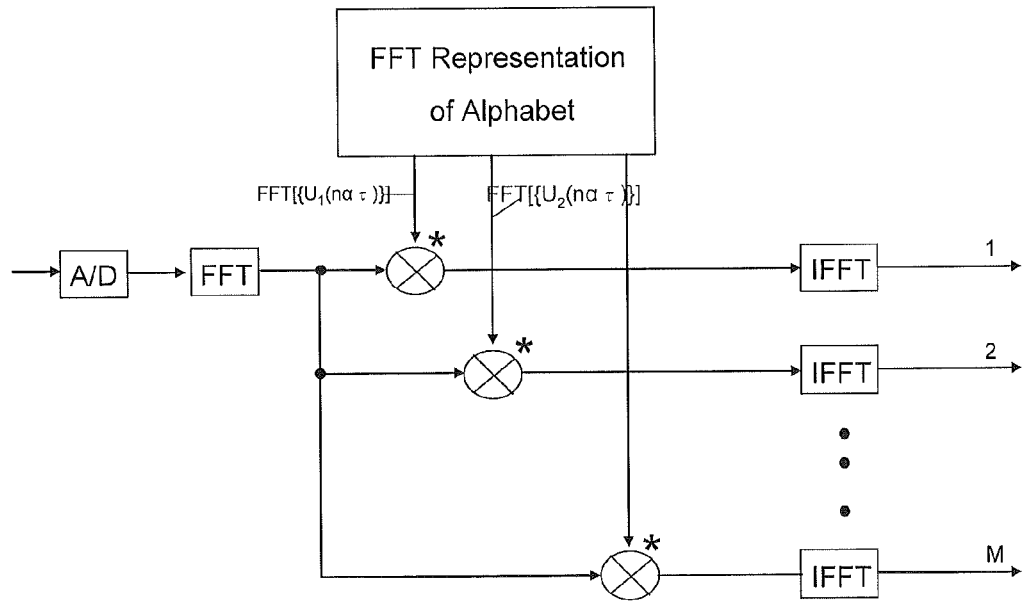

FIG. 10 illustrates an operational scenario relating to a covert communications system, in accordance with some embodiments of the invention, wherein air-to-ground, air-to-air, air-to-satellite and/or satellite-to-ground communications may be conducted. Ground-to-ground communications (not illustrated in FIG. 10) may also be conducted. Modes of communications may be, for example, point-to-point and/or point-to-multipoint. A network topology that is predetermined and/or configured in an ad hoc fashion, in accordance with principles known to those skilled in the art, may be used to establish communications in accordance with any of the embodiments of the invention and/or combinations thereof.

Figure 15:
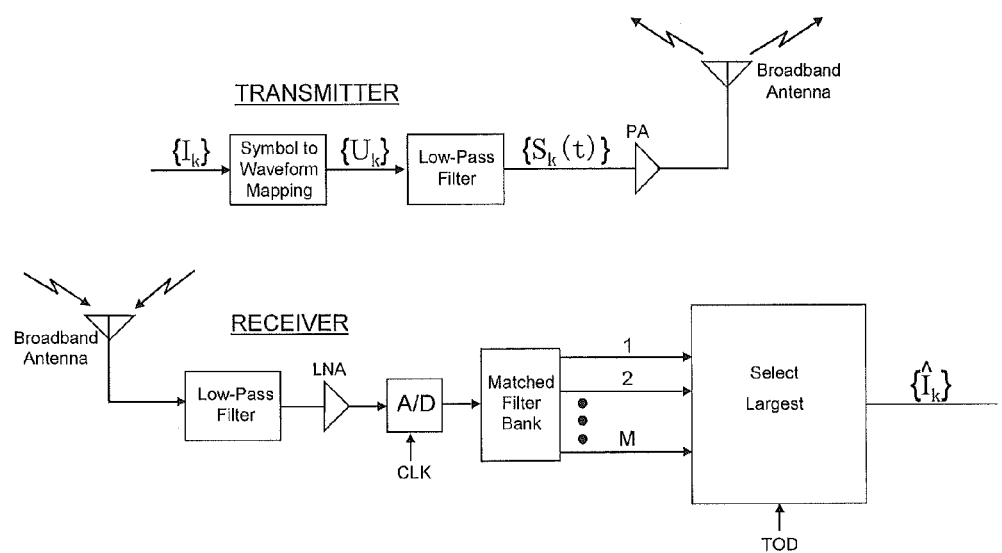
FIG. 15 is a schematic illustration of further functions of a transmitter and receiver according to further embodiments of the present invention.

FIGS. 11 through 14 illustrate elements relating to a matched filter and/or a matched filter bank in accordance with exemplary embodiments of the invention, as will be appreciated by those skilled in the art. FIG. 15 further illustrates elements of a transmitter/receiver combination in accordance with some embodiments of the invention.

In some embodiments of the invention, a transmitter may be configured to selectively radiate a pseudo-random noise waveform (that may be substantially void of information) and may, for example, be Gaussian distributed, occupying a bandwidth that is substantially the same as a bandwidth occupied by a communications waveform. The transmitter may be configured to selectively radiate the pseudo-random noise waveform during periods of time during which no communications information is being transmitted. This may be used, in some embodiments, to create a substantially constant/invariant ambient/background noise floor, that is substantially independent of whether or not communications information is being transmitted, to thereby further mask an onset of communications information transmission.

It will be understood by those skilled in the art that communications systems, waveforms and/or principles described herein may also find applications in systems wherein covertness may not be a primary concern. Communications systems, waveforms and/or principles described herein may, for example, be used to provide short-range wireless communications (that may be broadband short-range wireless communications) in, for example, a home, office, conference and/or business environment while reducing and/or minimizing a level of interference to one or more other communications services that may be using the same, partially the same and/or near-by frequencies as the short-range communications system. Other applications of communications systems, waveforms and/or principles described herein will also occur to those skilled in the art, including, for example, radar applications and/or cellular telecommunications applications. In a cellular telecommunications application, for example, a cellular telecommunications system, in accordance with communications waveform principles described herein, may be configured, for example, as an overlay to one or more conventional cellular/PCS systems and/or one or more other systems, using the frequencies of one or more licensed and/or unlicensed bands (that may also be used by the one or more conventional cellular/PCS systems and/or the one or more other systems) to communicate with user equipment using broadband and/or Ultra Wide-Band (UWB) waveforms. The broadband and/or UWB waveforms may be non-cyclostationary and/or Gaussian-distributed, in accordance with the teachings of the present invention, to thereby reduce and/or minimize a level of interference to the one or more conventional cellular/PCS systems and/or to the one or more other systems by the overlay cellular telecommunications system and thereby allow the overlay cellular telecommunications system to reuse the available spectrum (which is also used by the one or more conventional cellular/PCS systems and/or the one or more other systems) to provide communications services to users. According to some embodiments of a cellular telecommunications application, a cellular telecommunications system that is configured to communicate with user devices using communications waveforms in accordance with the transmitter, receiver and/or waveform principles described herein, is an overlay to one or more conventional cellular/PCS systems and/or to one or more other systems and is using the frequencies of one or more licensed and/or unlicensed bands (also being used by the one or more conventional cellular/PCS systems and/or the one or more other systems) and may be configured to communicate with the user devices preferentially using frequencies of the one or more licensed and/or unlicensed bands that are locally not used substantially and/or are locally used substantially as guardbands and/or transition bands by the one or more conventional cellular/PCS systems and/or the one or more other systems, to thereby further reduce a level of interference between the cellular telecommunications system and the one or more conventional cellular/PCS systems and/or the one or more other systems. As used herein, the terms "locally not used substantially" and/or "locally used substantially as guardbands and/or transition bands" refer to a local service area of a base station and/or group of base stations and/or access point(s) of the cellular telecommunications system. In such a service area, the cellular telecommunications system may, for example, be configured to identify frequencies that are "locally not used substantially" and/or frequencies that are "locally used substantially as guardbands and/or transition bands" by the one or more conventional cellular/PCS systems and/or the one or more other systems and preferentially use the identified frequencies to communicate bidirectionally and/or unidirectionally with user equipment thereby further reducing or minimizing a measure of interference.

Specific exemplary embodiments of the invention have been described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second may be used herein to describe various elements, these elements should not be limited by these terms. These terms are only used to distinguish one element from another element. As used herein, the term "and/or" includes any and all combinations of one or more of the associated listed items. The symbol "/" is also used as a shorthand notation for "and/or".

The present invention was described above with reference to block diagrams of methods, apparatus (systems), components and/or computer program products according to embodiments of the invention. It is understood that a given block of the block diagrams, and combinations of blocks in the block diagrams may be implemented by computer program instructions. These computer program instructions may be provided to a processor of a general purpose computer, special purpose computer, such as a digital signal processor, and/or other programmable data processing apparatus to produce a machine, such that the instructions, which execute via the processor of the computer and/or other programmable data processing apparatus, create means for implementing the functions/acts specified in the block diagrams block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagram block or blocks.

In the specification and the Figures thereof, there have been disclosed embodiments of the invention and, although specific terms are employed, they are used in a generic and descriptive sense only and not for purposes of limitation; the scope of the invention being set forth in the following claims.

What is claimed is:

1. A communications method comprising:
processing by a processor an input bit sequence $\{b\}$ to thereby form an information symbol sequence $\{I_k\}$; wherein k denotes values of discrete time; k=1, 2, ...;
mapping by the processor the information symbol sequence $\{I_k\}$ into a waveform sequence $\{U_k(nT)\}$; wherein for each value of k, n=1, 2, ..., N; and
conveying information by a transmitter by transmitting the waveform sequence $\{U_k(nT)\}$;
wherein the processor is configured to vary a bandwidth B of the waveform sequence $\{U_k(nT)\}$, without resorting to chipping in order to vary the bandwidth B of the waveform sequence, by using for said mapping first and second waveform elements that differ therebetween in bandwidth such that first and second waveform symbols of the waveform sequence $\{U_k(nT)\}$ comprise respective first and second bandwidths that differ therebetween; and/or
wherein the processor is configured to vary a frequency range that is used to provide frequency content to the waveform sequence $\{U_k(nT)\}$, without resorting to chipping in order to vary the frequency range, by using for said mapping third and fourth waveform elements that comprise respective third and fourth frequency ranges that differ therebetween in frequency content such that third and fourth waveform symbols of the waveform sequence $\{U_k(nT)\}$ comprise respective third and fourth ranges of frequencies that differ therebetween in frequency content.

2. The communications method according to claim 1, wherein said mapping by the processor the information symbol sequence $\{I_k\}$ into a waveform sequence $\{U_k(nT)\}$ comprises:
mapping by the processor the information symbol sequence $\{I_k\}$ into a baseband waveform sequence $\{U_k(nT)\}$ by basing said mapping on at least two baseband waveform elements that differ in bandwidth therebetween.

3. The communications method according to claim 1, wherein said mapping by the processor the information symbol sequence $\{I_k\}$ into a waveform sequence $\{U_k(nT)\}$ comprises:
mapping by the processor the information symbol sequence $\{I_k\}$ into a baseband waveform sequences $\{U_k(nT)\}$ by basing said mapping on at least two baseband waveform elements that differ in frequency content therebetween.

4. The communications method according to claim 1, wherein the third and fourth ranges of frequencies that differ therebetween and are used to provide frequency content to the third and fourth waveform symbols of $\{U_k(nT)\}$, respectively, are separated therebetween by a range of frequencies that is devoid of providing frequency content to any waveform symbol of $\{U_k(nT)\}$ in order to avoid interference.

5. A communications method comprising:
receiving by a receiver a waveform sequence $\{U_k(nT)\}$; wherein k denotes values of discrete time; k=1, 2, ...; and wherein for each value of k, n=1, 2, ..., N;
correlating the waveform sequence $\{U_k(nT)\}$ that is received by the receiver with a plurality of elements of a waveform alphabet;
mapping the waveform sequence $\{U_k(nT)\}$ into an information symbol sequence $\{I_k\}$ responsive to said correlating; and
receiving information by the receiver responsive to said mapping;
wherein said waveform alphabet comprises first and second waveforms comprising respective first and second spectral components that differ therebetween.

6. The communications method according to claim 5, wherein said first and second waveforms comprising respective first and second spectral components that differ therebetween further comprise respective first and second bandwidths that differ therebetween and/or respective first and second ranges of frequencies that differ therebetween.

7. The communications method according to claim 5, wherein said correlating the waveform sequence $\{U_k(nT)\}$ that is received by the receiver with a plurality of elements of a waveform alphabet comprises:
using first and second Fourier transform operations.

8. The communications method according to claim 5, wherein each one of the first and second waveforms is a discrete time-domain waveform whose values are pseudo-randomly generated responsive to a predetermined statistical distribution and a key input to a pseudo-random number generator.

9. The communications method according to claim 8, wherein the first and second waveforms are statistically independent and orthogonal therebetween.

10. A communications system comprising:
a processor that is configured to convert an input bit sequence $\{b\}$ into an information symbol sequence $\{I_k\}$; wherein k denotes values of discrete time; k=1, 2, ...; and to map the information symbol sequence $\{I_k\}$ into a waveform sequence $\{U_k(nT)\}$; wherein for each value of k, n=1, 2, ..., N; and
a transmitter that is configured to convey information by transmitting the waveform sequence $\{U_k(nT)\}$;
wherein the processor is configured to vary a bandwidth B of the waveform sequence $\{U_k(nT)\}$, without resorting to chipping in order to vary the bandwidth B of the waveform sequence, by using first and second waveform elements in order to map the information symbol sequence $\{I_k\}$ into a waveform sequence $\{U_k(nT)\}$ that differ therebetween in bandwidth such that first and second waveform symbols of the waveform sequence $\{U_k(nT)\}$ comprise respective first and second bandwidths that differ therebetween; and/or wherein the processor is configured to vary a frequency range that is used to provide frequency content to the waveform sequence $\{U_k(nT)\}$, without resorting to chipping in order to vary the frequency range, by using third and fourth waveform elements in order to map the information symbol sequence $\{I_k\}$ into a waveform sequence $\{U_k(nT)\}$ that comprise respective third and fourth frequency ranges that differ therebetween in frequency content such that third and fourth waveform symbols of the waveform sequence $\{U_k(nT)\}$ comprise respective third and fourth ranges of frequencies that differ therebetween in frequency content.

11. The communications system according to claim 10, wherein the processor is configured to map the information symbol sequence $\{I_k\}$ into the waveform sequence $\{U_k(nT)\}$ by using at least two baseband waveform elements that differ in bandwidth therebetween; and wherein the waveform sequence $\{U_k(nT)\}$ comprises a baseband waveform sequence.

12. The communications system according to claim 10, wherein the processor is configured to map the information symbol sequence $\{I_k\}$ into the waveform sequence $\{U_k(nT)\}$ by using at least two baseband waveform elements that differ in frequency content therebetween; and wherein the waveform sequence $\{U_k(nT)\}$ comprises a baseboard waveform sequence.

13. The communications system according to claim 10, wherein the third and fourth ranges of frequencies that differ therebetween and are used to provide frequency content to the third and fourth waveform symbols of $\{U_k(nT)\}$, respectively, are separated therebetween by a range of frequencies that is devoid of providing frequency content to any waveform symbol of $\{U_k(nT)\}$ in order to avoid interference.

14. A communications system comprising:
a receiver that is configured to receive a waveform sequence $\{U_k(nT)\}$; wherein k denotes values of discrete time; k=1, 2, . . . ; and wherein for each value of k, n=1, 2, . . . , N; and
a processor that is configured to correlate the waveform sequence $\{U_k(nT)\}$ with a plurality of elements of a waveform alphabet; to map the waveform sequence $\{U_k(nT)\}$ into an information symbol sequence $\{I_k\}$ responsive to said correlation and to receive information responsive to said mapping;
wherein said waveform alphabet comprises first and second waveforms comprising respective first and second spectral components that differ therebetween.

15. The communications system according to claim 14, wherein said first and second waveforms comprising respective first and second spectral components that differ therebetween further comprise respective first and second bandwidths that differ therebetween and/or respective first and second ranges of frequencies that differ therebetween.

16. The communications system according to claim 14, wherein the processor that is configured to correlate the waveform sequence $\{U_k(nT)\}$ with a plurality of elements of a waveform alphabet is further configured to perform first and second Fourier transformations in order to implement said correlation.

17. The communications system according to claim 14, wherein each one of the first and second waveforms is a discrete time-domain waveform whose values are pseudo-randomly generated responsive to a predetermined statistical distribution and a key input to a pseudo-random number generator.

18. The communications system according to claim 17, wherein the first and second waveforms are statistically independent therebetween.

19. The communications system according to claim 18, wherein the first and second waveforms are orthogonal therebetween.

20. A communications method comprising:
processing by a processor an input bit sequence $\{b\}$ to thereby form an information symbol sequence $\{I_k\}$; wherein k=1, 2, . . . ;
mapping by the processor the information symbol sequence $\{I_k\}$ into a baseband waveform sequence $\{U_k(nT)\}$ by using first and second waveform elements differing in spectral content therebetween; wherein for each value of k, n=1, 2, . . . ; and
conveying information by a transmitter by transmitting the baseband waveform sequence $\{U_k(nT)\}$;
wherein the processor is configured to vary a spectral content of the baseband waveform sequence $\{U_k(nT)\}$, without resorting to conventional chipping with a binary waveform, by using the first and second waveform elements that differ therebetween in spectral content and by basing respective first and second waveform symbols of the baseband waveform sequence $\{U_k(nT)\}$ on said first and second waveform elements that differ therebetween in spectral content.

21. The communications method according to claim 20, wherein said using first and second waveform elements differing in spectral content therebetween comprises:
using first and second waveform elements differing in bandwidth and/or frequency content therebetween.

22. The communications method according to claim 20, wherein the processor is further configured to distribute a frequency content of the baseband waveform sequence $\{U_k(nT)\}$ over first and second frequency intervals that are separated therebetween by a third frequency interval and to refrain from distributing the frequency content over the third frequency interval in order to avoid interference.

23. The communications method according to claim 20, wherein the processor is further configured to vary a frequency range that is used to provide frequency content to the baseband waveform sequence $\{U_k(nT)\}$ such that third and fourth waveform symbols of the baseband waveform sequence $\{U_k(nT)\}$ are defined over respective third and fourth frequency ranges that differ therebetween.

24. The communications method according to claim 23, wherein the third and fourth frequency ranges that differ therebetween, are separated therebetween by a range of frequencies that is devoid of providing frequency content to the third and fourth waveform symbols in order to avoid interference.

25. The communications method according to claim 20, wherein k comprises a measure of discrete time; and wherein for a first value of k, n=1, 2, . . . , N; and for a second value of k, n=1, 2, . . . , M; wherein the first and second values of k differ therebetween; and wherein N and M differ therebetween.

26. The communications method according to claim 25, wherein for the first value of k the duration of the baseband waveform $U_k(nT)$ comprises a first value NT; and for the second value of k the duration of the baseband waveform $U_k(nT)$ comprises a second value MT that differs from the first value NT.

27. The communications method according to claim 20, wherein first and second values of k comprise respective first and second successive integer values of k; and wherein respective first and second baseband waveforms of the baseband waveform sequence $\{U_k(nT)\}$ corresponding to the first and second values of k and differing therebetween in spectral content are transmitted by the transmitter in order to convey information over respective first and second transmission intervals that are adjacent therebetween and are separated therebetween by one transmit/receive symbol interval.

28. The communications method according to claim 20, wherein at least one of the first and second waveform elements that differ in spectral content therebetween comprises a waveform that is generated pseudo-randomly, independently of the information symbol sequence $\{I_k\}$, responsive to a predetermined statistical distribution and by using and a pseudo-random number generator.

29. The communications method according to claim 28, wherein the predetermined statistical distribution is a Gaussian distribution.

30. The communications method according to claim 20, wherein the baseband waveform sequence $\{U_k(nT)\}$ is devoid of a regularly repeating peak amplitude level while the transmitter is conveying information.

31. The communications method according to claim 20, wherein the transmitter is devoid of a modulator and/or frequency translator; and wherein the transmitter is configured to convey information by transmitting the baseband waveform sequence $\{U_k(nT)\}$ without subjecting the baseband waveform sequence $\{U_k(nT)\}$ to a modulator and/or frequency translator.

32. The communications method according to claim 20, wherein the transmitter comprises a modulator and/or frequency translator; and wherein the transmitter is configured to convey information by transmitting the baseband waveform sequence $\{U_k(nT)\}$ following having subjected the baseband waveform sequence $\{U_k(nT)\}$ to the modulator and/or frequency translator.

33. The communications method according to claim 20, wherein each one of the first and second waveform elements that differ in spectral content therebetween comprises a waveform that is generated pseudo-randomly and independently of the information symbol sequence $\{I_k\}$; and wherein the first and second waveform elements that differ in spectral content therebetween are statistically independent and orthogonal therebetween.

34. A communications system comprising:
a processor that is configured to process an input bit sequence {b} to thereby form an information symbol sequence $\{I_k\}$; wherein k=1, 2, . . . ; and to map the information symbol sequence $\{I_k\}$ into a baseband waveform sequence $\{U_k(nT)\}$ by using first and second waveform elements differing in spectral content therebetween; wherein for each value of k, n=1, 2, . . . ; and
a transmitter that is configured to convey information by transmitting the baseband waveform sequence $\{U_k(nT)\}$;
wherein the processor is further configured to vary a spectral content of the baseband waveform sequence $\{U_k(nT)\}$, without resorting to conventional chipping with a binary waveform, by using the first and second waveform elements that differ therebetween in spectral content and by basing respective first and second waveform symbols of the baseband waveform sequence $\{U_k(nT)\}$ on said first and second waveform elements that differ therebetween in spectral content.

35. The communications system according to claim 34, wherein said using first and second waveform elements differing in spectral content therebetween comprises:
using first and second waveform elements differing in bandwidth and/or frequency content therebetween.

36. The communications system according to claim 34, wherein the processor is further configured to distribute a frequency content of the baseband waveform sequence $\{U_k(nT)\}$ over first and second frequency intervals that are separated therebetween by a third frequency interval and to refrain from distributing the frequency content over the third frequency interval in order to avoid interference.

37. The communications system according to claim 34, wherein the processor is further configured to vary a frequency range that is used to provide frequency content to the baseband waveform sequence $\{U_k(nT)\}$ such that third and fourth waveform symbols of the baseband waveform sequence $\{U_k(nT)\}$ are defined over respective third and fourth frequency ranges that differ therebetween.

38. The communications system according to claim 37, wherein the third and fourth frequency ranges that differ therebetween, are separated therebetween by a range of frequencies that is devoid of providing frequency content to the third and fourth waveform symbols in order to avoid interference.

39. The communications system according to claim 34, wherein k comprises a measure of discrete time; and wherein for a first value of k, n=1, 2, . . . , N; and for a second value of k, n=1, 2, . . . , M; wherein the first and second values of k differ therebetween; and wherein N and M differ therebetween.

40. The communications system according to claim 39, wherein for the first value of k the duration of the baseband waveform $U_k(nT)$ comprises a first value NT; and for the second value of k the duration of the baseband waveform $U_k(nT)$ comprises a second value MT that differs from the first value NT.

41. The communications system according to claim 34, wherein first and second values of k comprise respective first and second successive integer values of k; and wherein respective first and second baseband waveforms of the baseband waveform sequence $\{U_k(nT)\}$ corresponding to the first and second values of k and differing therebetween in spectral content are transmitted by the transmitter in order to convey information over respective first and second transmission intervals that are adjacent therebetween and are separated therebetween by one transmit/receive symbol interval.

42. The communications system according to claim 34, wherein at least one of the first and second waveform elements that differ in spectral content therebetween comprises a waveform that is generated pseudo-randomly, independently of the information symbol sequence $\{I_k\}$, responsive to a predetermined statistical distribution and by using a pseudo-random number generator.

43. The communications system according to claim 42, wherein the predetermined statistical distribution is a Gaussian distribution.

44. The communications system according to claim 34, wherein the baseband waveform sequence $\{U_k(nT)\}$ is devoid of a regularly repeating peak amplitude level while the transmitter is conveying information.

45. The communications system according to claim 34, wherein the transmitter is devoid of a modulator and/or frequency translator; and wherein the transmitter is configured to convey information by transmitting the baseband waveform sequence $\{U_k(nT)\}$ without subjecting the baseband waveform sequence $\{U_k(nT)\}$ to a modulator and/or frequency translator.

46. The communications system according to claim 34, wherein the transmitter comprises a modulator and/or frequency translator; and wherein the transmitter is configured to convey information by transmitting the baseband waveform sequence $\{U_k(nT)\}$ following having subjected the baseband waveform sequence $\{U_k(nT)\}$ to the modulator and/or frequency translator.

47. The communications system according to claim 34, wherein each one of the first and second waveform elements that differ in spectral content therebetween comprises a waveform that is generated pseudo-randomly and independently of the information symbol sequence $\{I_k\}$; and wherein the first and second waveform elements that differ in spectral content therebetween are statistically independent and orthogonal therebetween.

\* \* \* \* \*

UNITED STATES PATENT AND TRADEMARK OFFICE
CERTIFICATE OF CORRECTION

PATENT NO.        : 8,576,940 B2                                    Page 1 of 1
APPLICATION NO.   : 13/780480
DATED             : November 5, 2013
INVENTOR(S)       : Karabinis It is certified that error appears in the above-identified patent and that said Letters Patent is hereby corrected as shown below:

In the Specification:
Column 4, Line 37: Please correct "be upper-bounded by G$\tau$B, where"
                              to read -- be upper-bounded by C$\tau$B, where --

In the Claims:
Column 13, Claim 12, Line 32: Please correct "baseboard waveform sequence."
                              to read -- baseband waveform sequence. --

Signed and Sealed this
Twenty-seventh Day of May, 2014

Michelle K. Lee
*Deputy Director of the United States Patent and Trademark Office*